(12) United States Patent
Yu et al.

(10) Patent No.: US 9,720,728 B2
(45) Date of Patent: Aug. 1, 2017

(54) MIGRATING A VM WHEN THE AVAILABLE MIGRATION DURATION TIMES OF A SOURCE AND DESTINATION NODE ARE GREATER THAN THE VM'S MIGRATION DURATION TIME

(71) Applicant: HUAWEI TECHNOLOGIES CO., LTD., Shenzhen, Guangdong (CN)

(72) Inventors: Fan Yu, Hangzhou (CN); Yuwang Gong, Hangzhou (CN); Zhenguo Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/557,994

(22) Filed: Dec. 2, 2014

(65) Prior Publication Data
US 2015/0160972 A1 Jun. 11, 2015

Related U.S. Application Data

(63) Continuation of application No. PCT/CN2014/083869, filed on Aug. 7, 2014.

(30) Foreign Application Priority Data

Dec. 6, 2013 (CN) .......................... 2013 1 0656235

(51) Int. Cl.
*G06F 9/48* (2006.01)
(52) U.S. Cl.
CPC .................................. *G06F 9/4856* (2013.01)
(58) Field of Classification Search
CPC ................................................... G06F 9/4856
See application file for complete search history.

(56) References Cited

U.S. PATENT DOCUMENTS

| 7,484,208 B1 | 1/2009 | Nelson |
| 8,095,929 B1 * | 1/2012 | Ji .......................... G06F 9/4856 709/223 |

(Continued)

FOREIGN PATENT DOCUMENTS

| CN | 102662763 | 9/2012 |
| CN | 102866915 | 1/2013 |

(Continued)

OTHER PUBLICATIONS

C. Jo, et al., "Efficient Live Migration of Virtual Machines Using Shared Storage," *Proceedings of the 2009 ACM Sigplan Conference on Programming Language Design and Implementation*, Jun. 2009.

(Continued)

*Primary Examiner* — Meng An
*Assistant Examiner* — Jorge A Chu Joy-Davila
(74) *Attorney, Agent, or Firm* — Staas & Halsey LLP (57) ABSTRACT

Embodiments of the present invention disclose a virtual machine migration management method, where the method includes: calculating, according to migration parameters of a to-be-migrated virtual machine, migration duration time required for migrating the to-be-migrated virtual machine from a source computing node to a destination computing node, where the migration parameters include an allocated memory size, a memory change rate, and migration network bandwidth that are of the to-be-migrated virtual machine; separately acquiring current available migration duration time of the source computing node and current available migration duration time of the destination computing node; and, if neither the current available migration duration time of the source computing node nor the current available migration duration time of the destination computing node is less than the migration duration time, determining to migrate (Continued)

the to-be-migrated virtual machine from the source computing node to the destination computing node.

8 Claims, 5 Drawing Sheets

(56) References Cited

U.S. PATENT DOCUMENTS

| | | | |
|---|---|---|---|
| 9,083,724 B2* | 7/2015 | Karnawat | H04L 67/1097 |
| 2011/0302577 A1* | 12/2011 | Reuther | G06F 9/45558 |
| | | | 718/1 |
| 2012/0263190 A1* | 10/2012 | Umehara | H04J 3/0635 |
| | | | 370/458 |
| 2013/0226645 A1* | 8/2013 | Renaghan | G06Q 10/1095 |
| | | | 705/7.19 |
| 2013/0268920 A1* | 10/2013 | Ursal | G06F 8/70 |
| | | | 717/131 |
| 2014/0082202 A1 | 3/2014 | Zhao | |
| 2014/0115162 A1* | 4/2014 | Kalyanaraman | H04L 29/08954 |
| | | | 709/226 |
| 2014/0298338 A1 | 10/2014 | Doi | |

FOREIGN PATENT DOCUMENTS

| | | |
|---|---|---|
| CN | 103064733 | 4/2013 |
| CN | 103685256 | 3/2014 |
| EP | 2 717 158 A1 | 4/2014 |
| JP | 2008-217302 | 9/2008 |
| JP | 4438807 | 3/2010 |
| JP | 2013-200615 | 10/2013 |
| WO | 2013/105217 | 7/2013 |

OTHER PUBLICATIONS

D. Kapil, et al., "Live Virtual Machine Migration Techniques: Survey and Research Challenges," *Advance Computing Conference (IACC), 2013 IEEE 3$^{rd}$ International*, Feb. 2013, pp. 963-969.
Extended European Search Report mailed Jul. 30, 2015 for corresponding European Patent Application No. 14795536.3.
PCT International Search Report dated Nov. 15, 2014 in corresponding International Patent Application No. PCT/CN2014/083869.
Liu, H et al., "Performance and Energy Modeling for Live Migration of Virtual Machines," HPDC'11, Jun. 8-11, 2011, 11 pages.
Chinese Office Action issued Apr. 7, 2016 in corresponding Chinese Patent Application No. 201310656235.1, 5 pages.
Search Report issued Mar. 11, 2016 in corresponding Chinese Patent Application No. 2013106562351, 2 pages.
Japanese Notice of Allowance mailed May 30, 2017 in corresponding Japanese Patent Application No. 2016-519928, 1 page.

* cited by examiner

MIGRATING A VM WHEN THE AVAILABLE MIGRATION DURATION TIMES OF A SOURCE AND DESTINATION NODE ARE GREATER THAN THE VM'S MIGRATION DURATION TIME

CROSS-REFERENCE TO RELATED APPLICATIONS

This application is a continuation of International Application No. PCT/CN2014/083869, filed on Aug. 7, 2014, which claims priority to Chinese Patent Application No. 201310656235.1, filed on Dec. 6, 2013, both of which are hereby incorporated by reference in their entireties.

TECHNICAL FIELD

The present invention relates to the field of computer technologies, and in particular, to a virtual machine migration management method, apparatus and system.

BACKGROUND

Hot migration of a virtual machine is a key technology in the virtualization field, and is a significant means to implement dynamic resource scheduling for a virtual cluster, hitless service change, and host maintenance. A fundamental principle of the hot migration of a virtual machine is: migrating a running virtual machine from a source physical machine to a destination physical machine in a case in which a service of a user is not affected or a user is unaware of the migration. In order to quickly implement integration of a hot resource and a power supply, each time multiple virtual machines may need to be determined to be migrated. A current policy is calculating, according to the number of virtual machines for concurrent migration of a host and with reference to an average value of historical migration duration time of virtual machines, the maximum number of virtual machines for migration that are accommodated in each host. However, a deviation in migration duration time is relatively large because of a difference in specifications and services. Therefore, assessment of the migration duration time is inaccurate and a proper decision on the hot migration of a virtual machine cannot be made.

SUMMARY

In view of this, embodiments of present invention provide a virtual machine migration management method, apparatus and system, which can dynamically calculate migration duration time of a virtual machine, thereby improving accuracy of decision on virtual machine migration to a certain extent.

To resolve the foregoing technical problem, a first aspect of an embodiment of the present invention provides a virtual machine migration management method, where the method includes:

calculating, according to migration parameters of a to-be-migrated virtual machine, migration duration time required for migrating the to-be-migrated virtual machine from a source computing node to a destination computing node, where the migration parameters include an allocated memory size, a memory change rate, and migration network bandwidth that are of the to-be-migrated virtual machine;

separately acquiring current available migration duration time of the source computing node and current available migration duration time of the destination computing node; and if neither the current available migration duration time of the source computing node nor the current available migration duration time of the destination computing node is less than the migration duration time, determining to migrate the to-be-migrated virtual machine from the source computing node to the destination computing node.

In a first possible implementation manner of the first aspect, the method further includes:

after migrating the to-be-migrated virtual machine from the source computing node to the destination computing node begins, subtracting the migration duration time from the current available migration duration time of the source computing node, and subtracting the migration duration time from the current available migration duration time of the destination computing node.

In a second possible implementation manner of the first aspect, the calculating, according to migration parameters of a to-be-migrated virtual machine, migration duration time required for migrating the to-be-migrated virtual machine from a source computing node to a destination computing node includes:

calculating migration duration time $MTV_{ij}=a_0(1-q^n)/(1-q)$ required for migrating the to-be-migrated virtual machine from a source computing node i to a destination computing node j, and the number of transfer times $n=\min\{N_0,N\}$, where $a_0=MV_{ij}/BWV_{ij}$, $q=MCRV_{ij}\times(MV_{ij}/BWV_{ij})<1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, and N is a minimum integer value meeting a condition in which $a_0\times q^{N-1}$ is less than a preset memory dirty page threshold.

In a third possible implementation manner of the first aspect, the calculating, according to migration parameters of a to-be-migrated virtual machine, migration duration time required for migrating the to-be-migrated virtual machine from a source computing node to a destination computing node includes:

calculating migration duration time $MTV_{ij}=a_0(1-q^n)/(1-q)$ required for migrating the to-be-migrated virtual machine from a source computing node i to a destination computing node j, and the number of transfer times $n=\min\{N_0,N\}$, where $a_0=((MV_{ij}\times CV_{ij})/BWV_{ij})$, $q=MCRV_{ij}\times((MV_{ij}\times CV_{ij})/BWV_{ij})<1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, N is a minimum integer value meeting a condition in which $a_0\times q^{N-1}$ is less than a preset memory dirty page threshold, and $CV_{ij}$ is a memory compression ratio of the to-be-migrated virtual machine.

With reference to the first aspect and the first to the third possible implementation manners of the first aspect, in a fourth possible implementation manner of the first aspect, the method further includes:

initializing available migration duration time $MT_i=N_i\times T$ of all computing nodes at the beginning of each time of resource scheduling, where $N_i$ is the number of virtual machines for concurrent migration supported by a corresponding computing node and T is a resource scheduling period.

With reference to the fourth possible implementation manner of the first aspect, in a fifth possible implementation manner of the first aspect, if it is detected, at the beginning of each time of resource scheduling, that a computing node is performing virtual machine migration, available migration duration time $MT_i=N_i \times T-MTV_{ij}$ of the computing node is initialized, where $MTV_{ij}$ is migration duration time of a virtual machine that is being migrated in the computing node.

Correspondingly, a second aspect of an embodiment of the present invention provides a virtual machine migration management apparatus, where the apparatus includes:

a migration duration time calculation module, configured to calculate, according to migration parameters of a to-be-migrated virtual machine, migration duration time required for migrating the to-be-migrated virtual machine from a source computing node to a destination computing node, where the migration parameters include an allocated memory size, a memory change rate, and migration network bandwidth that are of the to-be-migrated virtual machine;

an available migration duration time management module, configured to separately acquire current available migration duration time of the source computing node and current available migration duration time of the destination computing node; and a migration determining module, configured to: if neither the current available migration duration time of the source computing node nor the current available migration duration time of the destination computing node is less than the migration duration time, determine to migrate the to-be-migrated virtual machine from the source computing node to the destination computing node.

In a first possible implementation manner of the second aspect, the available migration duration time management module is further configured to:

after migrating the to-be-migrated virtual machine from the source computing node to the destination computing node begins, subtract the migration duration time from the current available migration duration time of the source computing node, and subtract the migration duration time from the current available migration duration time of the destination computing node.

In a second possible implementation manner of the second aspect, that the migration duration time calculation module calculates the migration duration time includes:

calculating migration duration time $MTV_{ij}=a_0(1-q^n)/(1-q)$ required for migrating the to-be-migrated virtual machine from a source computing node i to a destination computing node j, and the number of transfer times $n=\min\{N_0, N\}$, where $a_0=MV_{ij}/BWV_{ij}$, $q=MCRV_{ij} \times (MV_{ij}/BWV_{ij}) < 1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, and N is a minimum integer value meeting a condition in which $a_0 \times q^{N-1}$ is less than a preset memory dirty page threshold.

In a third possible implementation manner of the second aspect, that the migration duration time calculation module calculates the migration duration time includes:

calculating migration duration time $MTV_{ij}=a_0(1-q^n)/(1-q)$ required for migrating the to-be-migrated virtual machine from a source computing node i to a destination computing node j, and the number of transfer times $n=\min\{N_0, N\}$, where $a_0=((MV_{ij} \times CV_{ij})/BWV_{ij})$, $q=MCRV_{ij} \times ((MV_{ij} \times CV_{ij})/BWV_{ij}) < 1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, N is a minimum integer value meeting a condition in which $a_0 \times q^{N-1}$ is less than a preset memory dirty page threshold, and $CV_{ij}$ is a memory compression ratio of the to-be-migrated virtual machine.

With reference to the second aspect and the first to the third possible implementation manners of the second aspect, the available migration duration time management module is further configured to:

initialize available migration duration time $MT_i=N_i \times T$ of all computing nodes at the beginning of each time of resource scheduling, where $N_i$ is the number of virtual machines for concurrent migration supported by a corresponding computing node and T is a resource scheduling period.

With reference to the fourth possible implementation manner of the second aspect, in a fifth possible implementation manner of the second aspect, the available migration duration time management module is further configured to:

if it is detected, at the beginning of each time of resource scheduling, that a computing node is performing virtual machine migration, initialize available migration duration time $MT_i=N_i \times T-MTV_{ij}$ of the computing node, where $MTV_{ij}$ is migration duration time of a virtual machine that is being migrated in the computing node.

Correspondingly, a third aspect of an embodiment of the present invention further provides a virtual machine migration management system, where the system includes at least two computing node devices, each of which accommodates a virtual machine and any one of virtual machine migration management apparatuses according to the second aspect of the embodiment of the present invention.

Correspondingly, a fourth aspect of an embodiment of the present invention further provides a virtual machine migration management system, where the system includes a source computing node that accommodates at least one to-be-migrated virtual machine, a destination computing node, and a virtual machine migration management apparatus; where the virtual machine migration management apparatus is configured to: calculate, according to migration parameters of the to-be-migrated virtual machine, migration duration time required for migrating the to-be-migrated virtual machine from the source computing node to the destination computing node, where the migration parameters include an allocated memory size, a memory change rate, and migration network bandwidth that are of the to-be-migrated virtual machine; separately acquire current available migration duration time of the source computing node and current available migration duration time of the destination computing node; and, if neither the current available migration duration time of the source computing node nor the current available migration duration time of the destination computing node is less than the migration duration time, determine to migrate the to-be-migrated virtual machine from the source computing node to the destination computing node.

In a first possible implementation manner of the fourth aspect of the embodiment of the present invention, the migration duration time may be obtained by means of calculation in either of the following two implementation manners:

calculating migration duration time $MTV_{ij}=a_0(1-q^n)/(1-q)$ required for migrating the to-be-migrated virtual machine from a source computing node i to a destination computing node j, and the number of transfer times $n=\min\{N_0, N\}$, where $a_0=MV_{ij}/BWV_{ij}$, $q=MCRV_{ij} \times (MV_{ij}/BWV_{ij}) < 1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, and N is a minimum integer value meeting a condition in which $a_0 \times q^{N-1}$ is less than a preset memory dirty page threshold; and calculating migration duration time $MTV_{ij}=a_0(1-q^n)/(1-q)$ required for migrating the to-be-migrated virtual machine from a source computing node i to a destination computing node j, and the number of transfer times $n=\min\{N_0,N\}$, where $a_0=((MV_{ij} \times CV_{ij})/BWV_{ij})$, $q=MCRV_{ij} \times ((MV_{ij} \times CV_{ij})/BWV_{ij})<1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, N is a minimum integer value meeting a condition in which $a_0 \times q^{N-1}$ is less than a preset memory dirty page threshold, and $CV_{ij}$ is a memory compression ratio of the to-be-migrated virtual machine.

According to embodiments of the present invention, migration duration time is dynamically calculated by using migration parameters of a to-be-migrated virtual machine, and the calculated migration duration time is compared with current available migration duration time of a source computing node and current available migration duration time of a destination computing node, so as to determine whether virtual machine migration can be performed, thereby improving accuracy of a decision on virtual machine migration to a certain extent.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 7:
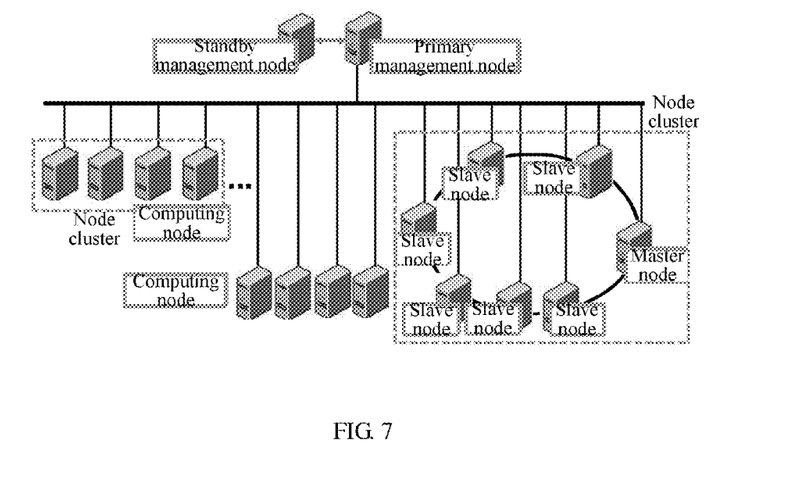
FIG. 7 is a schematic structural diagram of a distributed resource management system mentioned in an embodiment of the present invention.

A virtual machine migration management method in the embodiments of the present invention may be implemented by using a virtual machine migration management apparatus. The virtual machine migration management apparatus may be implemented in an independent node device, and may also be implemented in a management node device of a distributed resource management system shown in FIG. 7. The distributed resource management system shown in FIG. 7 includes a management node device and multiple computing nodes, where the multiple computing nodes may be aggregated into a node cluster. A master node Master and a slave node Slave may further be set in the node cluster.

Figure 1:
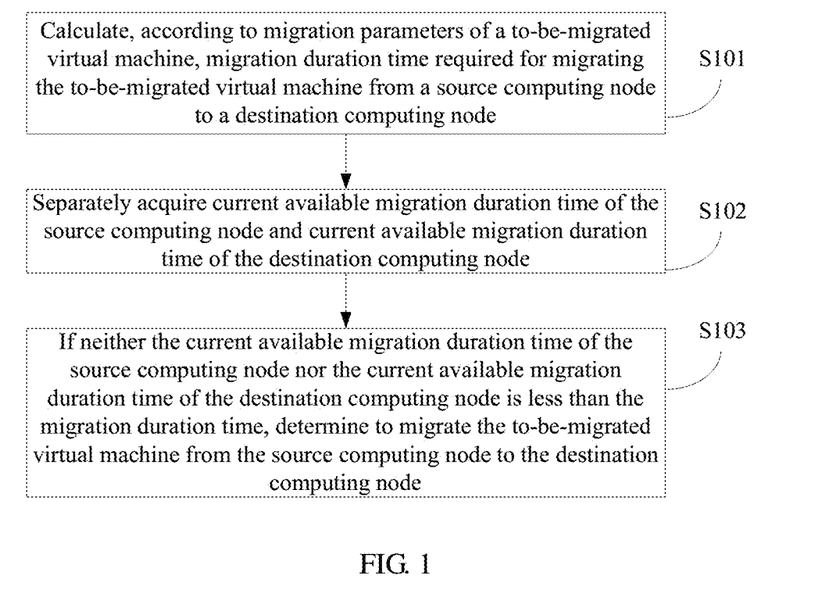
FIG. 1 is a schematic flowchart of a virtual machine migration management method according to an embodiment of the present invention.

FIG. 1 is a schematic flowchart of a virtual machine migration management method according to an embodiment of the present invention. As shown in the figure, the virtual machine migration management method in this embodiment may at least include:

S101. Calculate, according to migration parameters of a to-be-migrated virtual machine, migration duration time required for migrating the to-be-migrated virtual machine from a source computing node to a destination computing node, where the migration parameters include an allocated memory size, a memory change rate, and migration network bandwidth that are of the to-be-migrated virtual machine.

An example in which virtual machine migration is performed in a pre-copy manner is used. A virtual machine migration management apparatus may decide on, according to a factor such as load balancing, a virtual machine $V_{ij}$ that needs to be migrated from a computing node i to a computing node j, that is, the to-be-migrated virtual machine, and further acquire a memory change rate $MCRV_{ij}$ specified by upper-layer service QoS (Quality of Service, quality of service guarantee) of the to-be-migrated virtual machine, and migration network bandwidth $BWV_{ij}$ specified by lower-layer network QoS of the to-be-migrated virtual machine. Further, a process of deducing the migration duration time may be as follows:

In the first time of copying, it is assumed that memory allocated by the source computing node to the virtual machine $V_{ij}$ is $MV_{ij}$, which is referred to as allocated memory in this embodiment. The allocated memory $MV_{ij}$ of the virtual machine $V_{ij}$ is transferred from the source computing node i to the destination computing node j, and the time consumed is:

$t_0=MV_{ij}/BWV_{ij}$; (exemplarily, a unit of $MV_{ij}$ may be Mb and a unit of $BWV_{ij}$ may be Mb/s)

In the second time of copying, within the time $t_0$ in the first time of copying, $t_0 \times MV_{ij} \times MCRV_{ij}$ in the allocated memory of the virtual machine $V_{ij}$ is changed, and this part of memory needs to be transferred again from the source computing node i to the destination computing node j, and a time consumed is:

$$t_1=t_0 \times MV_{ij} \times MCRV_{ij}/BWV_{ij}=MCRV_{ij} \times (MV_{ij}/BWV_{ij})^2;$$

In the third time of copy, within the time $t_1$ in the second time of copying, $t_1 \times MV_{ij} \times MCRV_{ij}$ in the allocated memory of the virtual machine $V_{ij}$ is changed, and this part of memory needs to be transferred again from the source computing node i to the destination computing node j, and a time consumed is:

$$t_2=t_1 \times MV_{ij} \times MCRV_{ij}/BWV_{ij}=(MCRV_{ij})^2 \times (MV_{ij}/BWV_{ij})^3;$$

and by analogy, the migration duration time should finally be:

$$MTV_{ij} = t_0 + t_1 + t_2 + \ldots + t_{n-1}$$
$$= MV_{ij}/BWV_{ij} + MCRV_{ij} \times (MV_{ij}/BWV_{ij})^2 + \ldots +$$
$$(MCRV_{ij})^{n-1} \times (MV_{ij}/BWV_{ij})^n$$

It is assumed that $a_0 = MV_{ij}/BWV_{ij}$, $q = MCRV_{ij} \times (MV_{ij}/BWV_{ij})$, generally, by setting $MCRV_{ij}$ and $BWV_{ij}$, it can be ensured that q is less than 1, and therefore the foregoing equation is convergent. Then, the foregoing equation is further simplified as:

$$MTV_{ij} = a_0 + a_0 \times q^1 + \ldots + a_0 \times q^{n-1} = a_0(1-q^n)/(1-q) \quad \text{Formula (1)}$$

where n is the total number of transfer times (rounds), $n = \min\{N_0, N\}$, $N_0$ is a preset maximum number of transfer times, and N is a minimum integer value meeting a condition in which $a_0 \times q^{N-1}$ is less than a preset memory dirty page threshold X. A memory dirty page is a memory page that changes in a transfer process of each time of copying. The memory dirty page threshold X is a value of the number of memory dirty pages and may be preset by an administrator. That is, when the number of memory dirty pages in a time of copying is less than the memory dirty page threshold, the copying may be stopped.

However, in an optional embodiment, the virtual machine migration may be performed in a manner of first compressing and then copying virtual machine memory. A memory compression ratio $CV_{ij}$ may be determined according to an adopted compression algorithm, and the formula (1) may be further adjusted to:

migration duration time $MTV_{ij} = a_0(1-q^n)/(1-q)$, and the number of transfer times $n = \min\{N_0, N\}$, where $a_0 = ((MV_{ij} \times CV_{ij})/BWV_{ij})$, $q = MCRV_{ij} \times ((MV_{ij} \times CV_{ij})/BWV_{ij}) < 1$, and a manner for determining n is the same as that in the foregoing description.

S102. Separately acquire current available migration duration time of the source computing node and current available migration duration time of the destination computing node.

Specifically, the available migration duration time may be set for each computing node, that is, the time required for virtual machine migration by the computing node in each scheduling period. For example, the available migration duration time of each computing node is initialized at regular intervals or when a typical event (such as adding/deleting a computing node to/from a virtual resource cluster, starting/shutting down a virtual machine) triggers resource scheduling. Further, the available migration duration time of the computing node may be updated along with a typical event (such as migrating a virtual machine originally running on the computing node to another computing node, or migrating a virtual machine originally running on another computing node to the computing node) that affects the available migration duration time and occurs on the computing node. After deciding on the virtual machine $V_{ij}$ that needs to be migrated from the computing node i to the computing node j, the virtual machine migration management apparatus may separately acquire the current available migration duration time of the source computing node, that is, the computing node i and the current available migration duration time of the destination computing node, that is, the computing node j.

S103. If neither the current available migration duration time of the source computing node nor the current available migration duration time of the destination computing node is less than the migration duration time, determine to migrate the to-be-migrated virtual machine from the source computing node to the destination computing node.

That is, the migration duration time that is required for migrating the to-be-migrated virtual machine from the source computing node to the destination computing node and is obtained by means of calculation in step S101 is separately compared with the current available migration duration time of the source computing node and the current available migration duration time of the destination computing node. If neither the current available migration duration time of the source computing node nor the current available migration duration time of the destination computing node is less than the migration duration time, it is determined that the to-be-migrated virtual machine can be migrated from the source computing node to the destination computing node. If the current available migration duration time of the source computing node is less than the migration duration time or the current available migration duration time of the destination computing node is less than the migration duration time, it is determined that the to-be-migrated virtual machine cannot be migrated from the source computing node to the destination computing node.

In an optional embodiment, after it is determined that the to-be-migrated virtual machine can be migrated from the source computing node to the destination computing node, the virtual machine migration management apparatus may separately send a virtual machine migration instruction to the source computing node and the destination computing node, so that the source computing node and the destination computing node start to perform the virtual machine migration of the to-be-migrated virtual machine. Meanwhile, the migration duration time is separately subtracted from the current available migration duration time of the source computing node and the current available migration duration time of the destination computing node, so that when virtual machine migration is needed next time, it may be determined, according to the updated available migration duration time, whether the virtual machine migration can be performed, thereby implementing a dynamic decision on virtual machine migration. A virtual machine is migrated, so as to implement accurate management of available migration duration time of a corresponding computing node.

However, in another optional embodiment, the virtual machine migration management apparatus may also separately subtract, after migration of the to-be-migrated virtual machine is completed, the actual migration duration time of the current migration from the current available migration duration time of the source computing node and from the current available migration duration time of the destination computing node, so as to implement more accurate management of available migration duration time of a computing node.

It may be learned that, in this embodiment, with reference to the virtual machine migration management method described in FIG. 1, migration duration time may be dynamically calculated according to migration parameters of a to-be-migrated virtual machine, and the calculated migration duration time is compared with current available migration duration time of a source computing node and current available migration duration time of a destination computing node, so as to determine whether virtual machine migration can be performed. The number of virtual machines for concurrent migration of a computing node may be dynamically managed, thereby implementing a more accurate decision on virtual machine migration.

Figure 2:
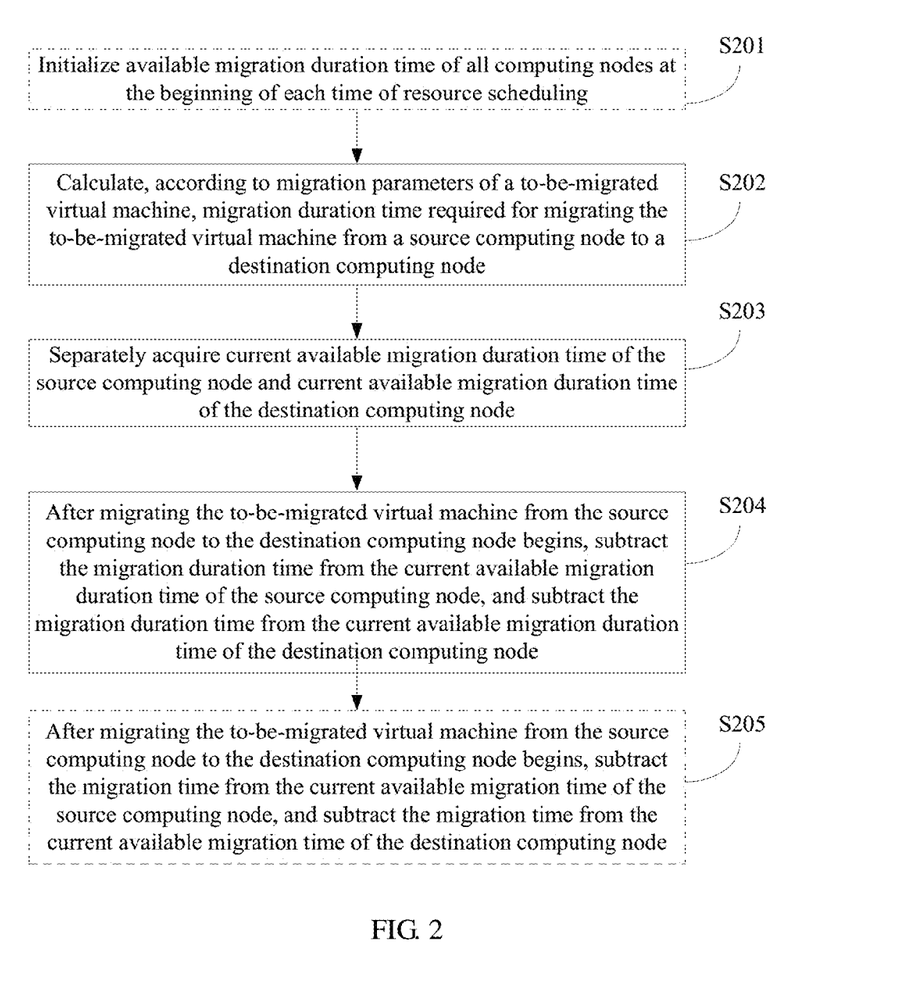
FIG. 2 is a schematic flowchart of a virtual machine migration management method according to another embodiment of the present invention.

FIG. 2 is a schematic flowchart of a virtual machine migration management method according to another embodiment of the present invention. As shown in the figure, the virtual machine migration management method in this embodiment may include:

S201. Initialize available migration duration time of all computing nodes at the beginning of each time of resource scheduling.

In specific implementation, available migration duration time of the computing node i may be initialized to $MT_i=N_i \times T$, where $N_i$ is the number of virtual machines for concurrent migration allowed by the computing node i and T is a resource scheduling period.

In an optional embodiment, when the available migration duration time of each computing node is initialized, it may be detected whether each computing node is currently performing virtual machine migration. If the computing node i is currently performing migration of a virtual machine $V_{ij}$ to the computing node j, available migration duration time of the computing node i may be initialized to $MT_i=N_i \times T-MTV_{ij}$, where $MTV_{ij}$ is migration duration time that is required for migrating the to-be-migrated virtual machine from the source computing node to the destination computing node and calculated according to migration parameters of the to-be-migrated virtual machine $V_{ij}$, where the migration parameters include an allocated memory size, a memory change rate, and migration network bandwidth that are of the to-be-migrated virtual machine. A specific manner of calculating the migration duration time is exemplified in detail in the foregoing embodiment, and details are not described again in this embodiment.

S202. Calculate, according to migration parameters of a to-be-migrated virtual machine, migration duration time required for migrating the to-be-migrated virtual machine from a source computing node to a destination computing node, where the migration parameters include an allocated memory size, a memory change rate, and migration network bandwidth that are of the to-be-migrated virtual machine.

Specifically, a virtual machine migration management apparatus may decide on, according to a factor such as load balancing, a virtual machine $V_{ij}$ that needs to be migrated from a computing node i to a computing node j, that is, the to-be-migrated virtual machine, and further acquire a memory change rate $MCRV_{ij}$ specified by upper-layer service QoS (Quality of Service, quality of service guarantee) of the to-be-migrated virtual machine, and migration network bandwidth $BWV_{ij}$ specified by lower-layer network QoS of the to-be-migrated virtual machine. Further, migration duration time $MTV_{ij}$ required for migrating the virtual machine $V_{ij}$ from the computing node i to the computing node j may be calculated. For a specific calculation method, reference may be made to step S101 in the foregoing embodiment, and details are not described again in this embodiment.

S203. Separately acquire current available migration duration time of the source computing node and current available migration duration time of the destination computing node.

S204. If neither the current available migration duration time of the source computing node nor the current available migration duration time of the destination computing node is less than the migration duration time, determine to migrate the to-be-migrated virtual machine from the source computing node to the destination computing node.

That is, the migration duration time that is required for migrating the to-be-migrated virtual machine from the source computing node to the destination computing node and obtained by means of calculation in step S202 is separately compared with the current available migration duration time of the source computing node and the current available migration duration time of the destination computing node. If neither the current available migration duration time of the source computing node nor the current available migration duration time of the destination computing node is less than the migration duration time, it is determined that the to-be-migrated virtual machine can be migrated from the source computing node to the destination computing node. If the current available migration duration time of the source computing node is less than the migration duration time or the current available migration duration time of the destination computing node is less than the migration duration time, it is determined that the to-be-migrated virtual machine cannot be migrated from the source computing node to the destination computing node.

S205. After migrating the to-be-migrated virtual machine from the source computing node to the destination computing node begins, subtract the migration duration time from the current available migration duration time of the source computing node, and subtract the migration duration time from the current available migration duration time of the destination computing node.

In specific implementation, after it is determined that the to-be-migrated virtual machine can be migrated from the source computing node to the destination computing node, the virtual machine migration management apparatus may separately send a virtual machine migration instruction to the source computing node and the destination computing node, so that the source computing node and the destination computing node start to perform the virtual machine migration of the to-be-migrated virtual machine. In addition, the migration duration time is separately subtracted from the current available migration duration time of the source computing node and from the current available migration duration time of the destination computing node. However, in another optional embodiment, the virtual machine migration management apparatus may also separately subtract, after migration of the to-be-migrated virtual machine is completed, an actual migration duration time of the current migration from the current available migration duration time of the source computing node and from the current available migration duration time of the destination computing node.

It may be learned that, in this embodiment, with reference to the virtual machine migration management method described in FIG. 2, migration duration time may be dynamically calculated according to migration parameters of a to-be-migrated virtual machine, and the calculated migration duration time is compared with current available migration duration time of a source computing node and current available migration duration time of a destination computing node, so as to determine whether virtual machine migration can be performed. The number of virtual machines for concurrent migration of a computing node may be dynamically managed, thereby implementing a more accurate decision on virtual machine migration.

Figure 3:
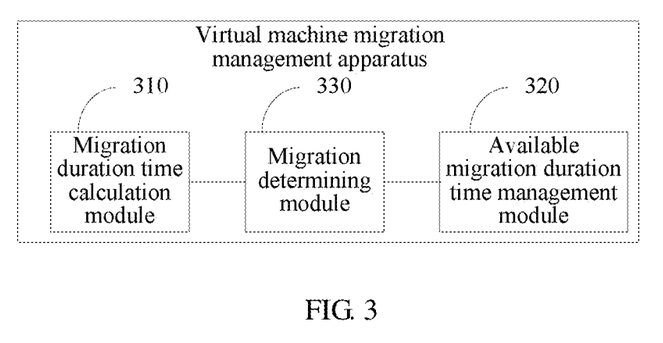
FIG. 3 is a schematic structural diagram of a virtual machine migration management apparatus according to an embodiment of the present invention.

FIG. 3 is a schematic structural diagram of a virtual machine migration management apparatus according to an embodiment of the present invention. The virtual machine migration management apparatus in the present invention may be implemented in a management node device of a distributed resource management system, and may also be implemented in another independent node device. As shown in the figure, the virtual machine migration apparatus in this embodiment may include:

a migration duration time calculation module 310, configured to calculate, according to migration parameters of a to-be-migrated virtual machine, migration duration time required for migrating the to-be-migrated virtual machine from a source computing node to a destination computing node, and the migration parameters include an allocated memory size, a memory change rate, and migration network bandwidth that are of the to-be-migrated virtual machine.

In specific implementation, an example in which virtual machine migration is performed in a pre-copy manner is used. A virtual machine migration management apparatus may decide on, according to a factor such as load balancing, a virtual machine $V_{ij}$ that needs to be migrated from a computing node i to a computing node j, that is, the to-be-migrated virtual machine, and further acquire a memory change rate $MCRV_{ij}$ specified by upper-layer service QoS (Quality of Service, quality of service guarantee) of the to-be-migrated virtual machine, and migration network bandwidth $BWV_{ij}$ specified by lower-layer network QoS of the to-be-migrated virtual machine. Further, the migration duration time calculation module 310 may calculate the migration duration time according to the formula (1):

$MT_{ij}=a_0(1-q^n)/(1-q)$, and the number of transfer times n=min{$N_0$, N}, where $a_0=MV_{ij}/BWV_{ij}$, $q=MCRV_{ij}\times(MV_{ij}/BWV_{ij})<1$, $MV_{ij}$ is the allocated memory size of the to-be-migrated virtual machine, $N_0$ is a preset maximum number of transfer times, and N is a minimum integer value meeting a condition in which $a_0\times q^{N-1}$ is less than a preset memory dirty page threshold. A specific process of calculating and deducing the migration duration time is described in detail in the foregoing embodiment, and details are not described again in this embodiment.

However, in an optional embodiment, the virtual machine migration may be performed in a manner of first compressing and then copying virtual machine memory. A memory compression ratio $CV_{ij}$ may be determined according to an adopted compression algorithm, and the formula (1) may be further adjusted to:

migration duration time $MTV_{ij}=a_0(1-q^n)/(1-q)$, and the number of transfer times n=min{$N_0$,N}, where $a_0=((MV_{ij}\times CV_{ij})/BWV_{ij})$, $q=MCRV_{ij}\times((MV_{ij}\times CV_{ij})/BWV_{ij})<1$, and a manner for determining n is the same as that in the foregoing description.

An available migration duration time management module 320 is configured to separately acquire current available migration duration time of the source computing node and current available migration duration time of the destination computing node.

Specifically, the available migration duration time management module 320 may set available migration duration time for each computing node, and initialize the available migration duration time of each computing node, for example, at an interval or when a typical event (such as adding/deleting a computing node to/from a virtual resource cluster, or starting/shutting down a virtual machine) triggers resource scheduling. Optionally, when the available migration duration time of each computing node is initialized, it may be first detected whether each computing node is currently performing virtual machine migration. If the computing node i is currently performing migration of a virtual machine $V_{ij}$ to the computing node j, available migration duration time of the computing node i may be initialized to $MT_i=N_i\times T-MTV_{ij}$, where $MTV_{ij}$ is migration duration time that is required for migrating the to-be-migrated virtual machine from the source computing node to the destination computing node and calculated by the migration duration time calculation module 310 according to migration parameters of the to-be-migrated virtual machine $V_{ij}$, and the migration parameters include an allocated memory size, a memory change rate, and migration network bandwidth that are of the to-be-migrated virtual machine.

Further, the available migration duration time of the computing node may be updated along with a typical event (such as migrating a virtual machine originally running on the computing node to another computing node, or migrating a virtual machine originally running on another computing node to the computing node) that affects the available migration duration time and occurs on the computing node. After deciding on the virtual machine $V_{ij}$ that needs to be migrated from the computing node i to the computing node j, the virtual machine migration management apparatus may separately acquire the current available migration duration time of the source computing node, that is, the computing node i and the current available migration duration time of the destination computing node, that is, the computing node j. For example, after the migration determining module 330 determines that the to-be-migrated virtual machine can be migrated from the source computing node to the destination computing node, the virtual machine migration management apparatus may separately send a virtual machine migration instruction to the source computing node and the destination computing node, so that the source computing node and the destination computing node start to perform the virtual machine migration of the to-be-migrated virtual machine. In addition, the available migration duration time management module 320 separately subtracts the migration duration time from the current available migration duration time of the source computing node and from the current available migration duration time of the destination computing node. However, in another optional embodiment, the available migration duration time management module 320 may also separately subtract, after migration of the to-be-migrated virtual machine is completed, actual migration duration time of the current migration from the current available migration duration time of the source computing node and from the current available migration duration time of the destination computing node.

A migration determining module 330 is configured to: if neither the current available migration duration time of the source computing node nor the current available migration duration time of the destination computing node is less than the migration duration time, determine to migrate the to-be-migrated virtual machine from the source computing node to the destination computing node.

That is, the migration duration time that is required for migrating the to-be-migrated virtual machine from the source computing node to the destination computing node and obtained by the migration duration time calculation module 310 by means of calculation is separately compared with the current available migration duration time of the source computing node and the current available migration duration time of the destination computing node. If neither the current available migration duration time of the source computing node nor the current available migration duration time of the destination computing node is less than the migration duration time, the migration determining module 330 determines that the to-be-migrated virtual machine can be migrated from the source computing node to the destination computing node. If the current available migration duration time of the source computing node is less than the migration duration time or the current available migration duration time of the destination computing node is less than the migration duration time, the migration determining module 330 determines that the to-be-migrated virtual machine cannot be migrated from the source computing node to the destination computing node.

In an optional embodiment, after it is determined that the to-be-migrated virtual machine can be migrated from the source computing node to the destination computing node, the migration determining module 330 may separately send a virtual machine migration instruction to the source computing node and the destination computing node, so that the source computing node and the destination computing node start to perform the virtual machine migration of the to-be-migrated virtual machine. Meanwhile, the migration determining module 330 may instruct the available migration duration time management module 320 to separately subtract the migration duration time from the current available migration duration time of the source computing node and from the current available migration duration time of the destination computing node.

It may be learned that, in this embodiment, with reference to the virtual machine migration management apparatus described in FIG. 3, migration duration time may be dynamically calculated according to migration parameters of a to-be-migrated virtual machine, and the calculated migration duration time is compared with current available migration duration time of a source computing node and current available migration duration time of a destination computing node, so as to determine whether virtual machine migration can be performed. The number of virtual machines for concurrent migration of a computing node may be dynamically managed, thereby implementing a more accurate decision on virtual machine migration.

Figure 4:
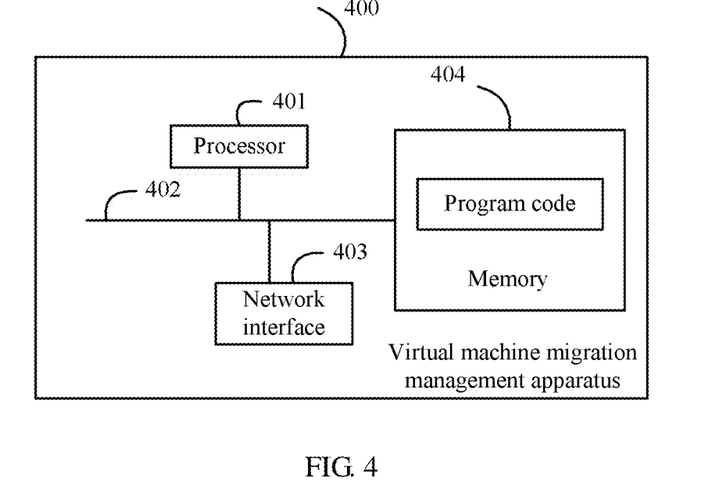
FIG. 4 is a schematic structural diagram of a virtual machine migration management apparatus according to another embodiment of the present invention.

FIG. 4 is a schematic structural diagram of a virtual machine migration management apparatus according to another embodiment of the present invention. As shown in FIG. 4, the virtual machine migration management apparatus 400 may include: at least one processor 401, such as a CPU, at least one network interface 403, a memory 404, and at least one communications bus 402. The communications bus 402 is configured to implement connection and communication between these components. The network interface 403 may optionally include a standard wired interface and a standard radio interface (such as a WI-FI interface). For example, an antenna apparatus is included and configured to perform signaling or data communication with another node device. The memory 404 may be a high-speed RAM memory, and may also be a non-volatile memory (non-volatile memory), such as at least one disk memory. The memory 404 may optionally further be at least one storage apparatus located far away from the foregoing processor 401. The memory 404 stores a group of program code, and the processor 401 is configured to invoke the program code stored in the memory 404. The program code is used to perform the following operations:

calculating, according to migration parameters of a to-be-migrated virtual machine, migration duration time required for migrating the to-be-migrated virtual machine from a source computing node to a destination computing node, where the migration parameters include an allocated memory size, a memory change rate, and migration network bandwidth that are of the to-be-migrated virtual machine;

separately acquiring current available migration duration time of the source computing node and current available migration duration time of the destination computing node; and if neither the current available migration duration time of the source computing node nor the current available migration duration time of the destination computing node is less than the migration duration time, determining to migrate the to-be-migrated virtual machine from the source computing node to the destination computing node.

Further, in an optional embodiment, the calculating, according to migration parameters of a to-be-migrated virtual machine, migration duration time required for migrating the to-be-migrated virtual machine from a source computing node to a destination computing node includes:

calculating migration duration time $MTV_{ij}=a_0(1-q^n)/(1-q)$ required for migrating the to-be-migrated virtual machine from a source computing node i to a destination computing node j, and the number of transfer times $n=\min\{N_0,N\}$, where $a_0=MV_{ij}/BWV_{ij}$, $q=MCRV_{ij}\times(MV_{ij}/BWV_{ij})<1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, and N is a minimum integer value meeting a condition in which $a_0 \times q^{N-1}$ is less than a preset memory dirty page threshold.

Further, in an optional embodiment, the virtual machine migration may be performed in a manner of first compressing and then copying virtual machine memory. A memory compression ratio $CV_{ij}$ may be determined according to an adopted compression algorithm, and the formula (1) may be further adjusted to:

migration duration time $MTV_{ij}=a_0(1-q^n)/(1-q)$, and the number of transfer times $n=\min\{N_0,N\}$, where $a_0=((MV_{ij}\times CV_{ij})/BWV_{ij})$, $q=MCRV_{ij}\times((MV_{ij}\times CV_{ij})/BWV_{ij})<1$, and a manner for determining n is the same as that in the foregoing description.

Further, in an optional embodiment, the processor 401 may further invoke the program code stored in the memory 404, so as to perform the following step:

after migrating the to-be-migrated virtual machine from the source computing node to the destination computing node begins, subtracting the migration duration time from the current available migration duration time of the source computing node, and subtracting the migration duration time from the current available migration duration time of the destination computing node. Therefore, when virtual machine migration is needed next time, it may be determined, according to an updated available migration duration time, whether the virtual machine migration can be performed, thereby implementing a dynamic decision on virtual machine migration. A virtual machine is migrated, so as to implement accurate management of available migration duration time of a corresponding computing node.

However, in another optional embodiment, the virtual machine migration management apparatus may also separately subtract, after migration of the to-be-migrated virtual machine is completed, an actual migration duration time of the current migration from the current available migration duration time of the source computing node and from the current available migration duration time of the destination computing node, so as to implement more accurate management of available migration duration time of a computing node.

Further, in an optional embodiment, the processor 401 may further invoke the program code stored in the memory 404, so as to perform the following step:

initializing available migration duration time $MT_i=N_i\times T$ of all computing nodes at the beginning of each time of resource scheduling, where $N_i$ is the number of virtual machines for concurrent migration supported by a corresponding computing node and T is a resource scheduling period.

Further, in an optional embodiment, when the available migration duration time of each computing node is initialized, it may be detected whether each computing node is currently performing virtual machine migration. If the computing node i is currently performing migration of a virtual machine $V_{ij}$ to the computing node j, available migration duration time of the computing node i may be initialized to $MT_i=N_i \times T-MTV_{ij}$, where $MTV_{ij}$ is migration duration time that is required for migrating the to-be-migrated virtual machine from the source computing node to the destination computing node and calculated according to migration parameters of the to-be-migrated virtual machine $V_{ij}$.

It may be learned that, in this embodiment, with reference to the virtual machine migration management apparatus described in FIG. 4, migration duration time may be dynamically calculated according to migration parameters of a to-be-migrated virtual machine, and the calculated migration duration time is compared with current available migration duration time of a source computing node and current available migration duration time of a destination computing node, so as to determine whether virtual machine migration can be performed. The number of virtual machines for concurrent migration of a computing node may be dynamically managed, thereby implementing a more accurate decision on virtual machine migration.

Figure 5:
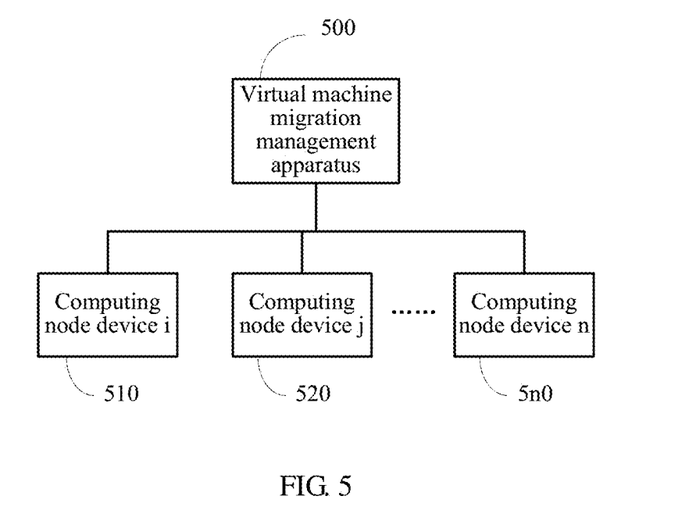
FIG. 5 is a schematic structural diagram of a virtual machine migration management system according to an embodiment of the present invention.

FIG. 5 is a schematic structural diagram of a virtual machine migration management system according to an embodiment of the present invention. As shown in the figure, the virtual machine migration management system in this embodiment of the present invention may at least include at least two of: a computing node device 510, a computing node device 520, . . . , and a computing node device 5n0, each of which accommodates a virtual machine, and a virtual machine migration management apparatus 500.

The virtual machine migration management apparatus 500 may be the virtual machine migration management apparatus described in any one of the foregoing embodiments, and is configured to: calculate, according to migration parameters of a to-be-migrated virtual machine, migration duration time required for migrating the to-be-migrated virtual machine from a source computing node to a destination computing node, where the migration parameters include an allocated memory size, a memory change rate, and migration network bandwidth that are of the to-be-migrated virtual machine; separately acquire current available migration duration time of the source computing node and current available migration duration time of the destination computing node; and, if neither the current available migration duration time of the source computing node nor the current available migration duration time of the destination computing node is less than the migration duration time, determine to migrate the to-be-migrated virtual machine from the source computing node to the destination computing node.

The computing node devices are configured to perform a migration operation on the to-be-migrated virtual machine when the virtual machine migration management apparatus determines to migrate the to-be-migrated virtual machine from the source computing node to the destination computing node.

Further, the virtual machine migration management system introduced in this embodiment may be used to implement all or a part of the process of the virtual machine migration management method in any one of the foregoing method embodiments.

Figure 6:
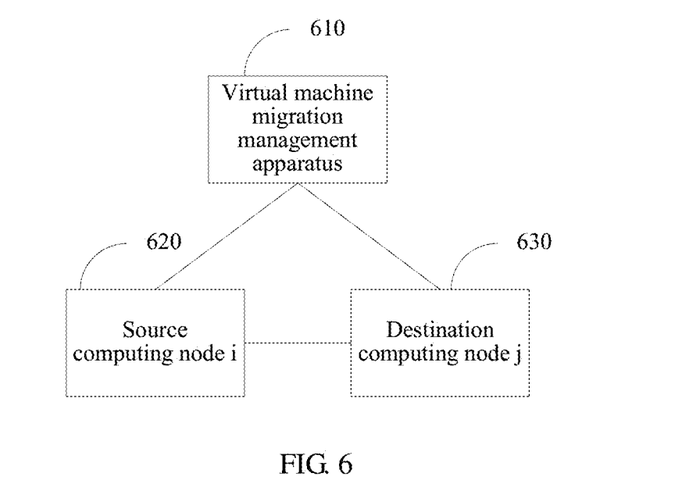
FIG. 6 is a schematic structural diagram of a virtual machine migration management system according to another embodiment of the present invention.

FIG. 6 is a virtual machine migration management system according to another embodiment of the present invention, where the system includes a source computing node i620 that accommodates at least one to-be-migrated virtual machine, a destination computing node j630, and a virtual machine migration management apparatus 610.

The virtual machine migration management apparatus 610 is configured to: calculate, according to migration parameters of the to-be-migrated virtual machine, migration duration time required for migrating the to-be-migrated virtual machine from the source computing node i620 to the destination computing node j630, where the migration parameters include an allocated memory size, a memory change rate, and migration network bandwidth that are of the to-be-migrated virtual machine; separately acquire current available migration duration time of the source computing node i620 and current available migration duration time of the destination computing node j630; and, if neither the current available migration duration time of the source computing node i620 nor the current available migration duration time of the destination computing node j630 is less than the migration duration time, determine to migrate the to-be-migrated virtual machine from the source computing node i620 to the destination computing node j630.

In an optional embodiment, the migration duration time may be obtained by means of calculation in either of the following two implementation manners:

calculating migration duration time $MTV_{ij}=a_0(1-q^n)/(1-q)$ required for migrating the to-be-migrated virtual machine from a source computing node i620 to a destination computing node j630, and the number of transfer times $n=\min\{N_0,N\}$, where $a_0=MV_{ij}/BWV_{ij}$, $q=MCRV_{ij}\times((MV_{ij}\times CV_{ij})/BWV_{ij})<1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, and N is a minimum integer value meeting a condition in which $a_0 \times q^{N-1}$ is less than a preset memory dirty page threshold; and calculating migration duration time $MTV_{ij}=a_0(1-q^n)/(1-q)$ required for migrating the to-be-migrated virtual machine from a source computing node i620 to the destination computing node j630, and the number of transfer times $n=\min\{N_0,N\}$, where $a_0=((MV_{ij}\times CV_{ij})/BWV_{ij})$, $q=MCR_{ij}\times((MV_{ij}\times CV_{ij})/BWV_{ij})<1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, N is a minimum integer value meeting a condition in which $a_0 \times q^{N-1}$ is less than a preset memory dirty page threshold, and $CV_{ij}$ is a memory compression ratio of the to-be-migrated virtual machine.

Further, the virtual machine migration management system introduced in this embodiment may be used to implement all or a part of the process of the virtual machine migration management method in any one of the foregoing method embodiments.

According to this embodiment of the present invention, migration duration time is dynamically calculated according to migration parameters of a to-be-migrated virtual machine, and the calculated migration duration time is compared with current available migration duration time of a source computing node and current available migration duration time of a destination computing node, so as to determine whether virtual machine migration can be performed. The number of virtual machines for concurrent migration of a computing node may be dynamically managed, thereby implementing a more accurate decision on virtual machine migration.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), a random access memory (Random Access Memory, RAM), or the like.

What are disclosed are merely exemplary embodiments of the present invention, but are not intended to limit the protection scope of the present invention. An equivalent variation made according to the claims of the present invention shall fall within the protection scope of the present invention.

What is claimed is:

1. A virtual machine migration management method, wherein the method comprises:
    calculating a migration duration time required for migrating a to-be-migrated virtual machine from a source computing node to a destination computing node according to an allocated memory size, a memory change rate, or a migration network bandwidth of the to-be-migrated virtual machine;
    separately acquiring a current available migration duration time of the source computing node and a current available migration duration time of the destination computing node;
    comparing the current available migration duration time of the source computing node and the current available migration duration time of the destination computing node to the migration duration time;
    migrating the to-be-migrated virtual machine from the source computing node to the destination computing node if both the current available migration duration time of the source computing node and the current available migration duration time of the destination computing node are greater than the migration duration time; and
    subtracting the migration duration time from the current available migration duration time of the source computing node, and subtracting the migration duration time from the current available migration duration time of the destination computing node,
    wherein the calculating, according to the allocated memory size, the memory change rate, or the migration network bandwidth of the to-be-migrated virtual machine, migration duration time required for migrating the to-be-migrated virtual machine from a source computing node to a destination computing node comprises:
    calculating migration duration time $MTV_{ij}=a_0(1-q^n)/(1-q)$ required for migrating the to-be-migrated virtual machine from a source computing node i to a destination computing node j, and the number of transfer times $n=\min\{N_0,N\}$, wherein $a_0=((MV_{ij} \times CV_{ij})/BWV_{ij})$, $q=MCRV_{ij} \times ((MV_{ij} \times CV_{ij})/BWV_{ij}) < 1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, N is a minimum integer value meeting a condition in which $a_0 \times q^{N-1}$ is less than a preset memory dirty page threshold, and $CV_{ij}$ is a memory compression ratio of the to-be-migrated virtual machine.

2. The virtual machine migration management method according to claim 1, wherein the method further comprises:
    initializing available migration duration time $MT_i=N_i \times T$ of all computing nodes at the beginning of each time of resource scheduling, wherein $N_i$ is the number of virtual machines for concurrent migration supported by a corresponding computing node and T is a resource scheduling period.

3. The virtual machine migration management method according to claim 2, wherein if it is detected that a computing node is performing virtual machine migration, available migration duration time $MT_i=N_i \times T-MTV_{ij}$ of the computing node is initialized, wherein $MTV_{ij}$ is migration duration time of a virtual machine that is being migrated in the computing node.

4. The virtual machine migration management method according to claim 1, wherein if either the current available migration duration time of the source computing node or the current available migration duration time of the destination computing node is less than the migration duration time, the to-be-migrated virtual machine cannot be migrated from the source computing node to the destination computing node.

5. A virtual machine migration management apparatus, comprising:
    a memory; and
    a processor coupled to the memory and configured to:
    calculate a migration duration time required for migrating a to-be-migrated virtual machine from a source computing node to a destination computing node according to an allocated memory size, a memory change rate, or a migration network bandwidth of the to-be-migrated virtual machine;
    separately acquire a current available migration duration time of the source computing node and a current available migration duration time of the destination computing node;
    compare the current available migration duration time of the source computing node and the current available migration duration time of the destination computing node to the migration duration time;
    migrate the to-be-migrated virtual machine from the source computing node to the destination computing node if both the current available migration duration time of the source computing node and the current available migration duration time of the destination computing node are greater than the migration duration time;
    subtract the migration duration time from the current available migration duration time of the source computing node, and subtract the migration duration time from the current available migration duration time of the destination computing node; and
    wherein the calculate a migration duration time required for migrating a to-be-migrated virtual machine from a source computing node to a destination computing node according to an allocated memory size, a memory change rate, or a migration network bandwidth of the to-be-migrated virtual machine comprises:
    calculate migration duration time $MTV_{ij}=a_0(1-q^n)/(1-q)$ required for migrating the to-be-migrated virtual machine from a source computing node i to a destination computing node j, and the number of transfer times n $=\min\{N_0,N\}$, wherein $a_0=((MV_{ij} \times CV_{ij})/BWV_{ij})$, $q=MCRV_{ij} \times ((MV_{ij} \times CV_{ij})/BWV_{ij}) < 1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number transfer times, N is a minimum integer value meeting a condition in which $a_0 \times q^{N-1}$ is less than a preset memory dirty page threshold, and $CV_{ij}$ is a memory compression ratio of the to-be-migrated virtual machine.

6. The virtual machine migration management apparatus according to claim 5, wherein the processor is further configured to:

initialize available migration duration time $MT_i=N_i \times T$ of all computing nodes at the beginning of each time of resource scheduling, wherein $N_i$ is the number of virtual machines for concurrent migration supported by a corresponding computing node and T is a resource scheduling period.

7. The virtual machine migration management apparatus according to claim 6, wherein the processor is further configured to:

if it is detected that a computing node is performing virtual machine migration, initialize available migration duration time $MT_i=N_i \times T - MTV_{ij}$ of the computing node, wherein $MTV_{ij}$ is migration duration time of a virtual machine that is being migrated in the computing node.

8. A virtual machine migration management system, comprising a source computing node that accommodates at least one to-be-migrated virtual machine, a destination computing node, and a virtual machine migration management apparatus using a processor; wherein the virtual machine migration management apparatus is configured to: calculate a migration duration time required for migrating the at least one to-be-migrated virtual machine from the source computing node to the destination computing node according to an allocated memory size, a memory change rate, or a migration network bandwidth of the at least one to-be-migrated virtual machine; separately acquire a current available migration duration time of the source computing node and a current available migration duration time of the destination computing node; compare the current available migration duration time of the source computing node and the current available migration duration time of the destination computing node to the migration duration time; and migrate the at least one to-be-migrated virtual machine from the source computing node to the destination computing node if both the current available migration duration time of the source computing node and the current available migration duration time of the destination computing node are greater than the migration duration time; and subtract the migration duration time from the current available migration duration time of the source computing node, and subtract the migration duration time from the current available migration duration time of the destination computing node;

wherein the calculate a migration duration time required for migrating the at least one to-be-migrated virtual machine from the source computing node to the destination computing node according to an allocated memory size, a memory change rate, or a migration network bandwidth of the at least one to-be-migrated virtual machine comprises:

calculate migration duration time $MTV_{ij}=a_0(1-q^n)/(1-q)$ required for migrating the to-be-migrated virtual machine from a source computing node i to a destination computing node j, and the number of transfer times n $=\min\{N_0,N\}$, wherein $a_0=((MV_{ij} \times CV_{ij})/BWV_{ij})$, $q=MCRV_{ij} \times ((MV_{ij} \times CV_{ij})/BWV_{ij}) < 1$, $MV_{ij}$ is the allocated memory size of the to-be-migrated virtual machine, $MCRV_{ij}$ is the memory change rate of the to-be-migrated virtual machine, $BWV_{ij}$ is the migration network bandwidth allocated to the to-be-migrated virtual machine, $N_0$ is a preset maximum number of transfer times, N is a minimum integer value meeting a condition in which $a_0 \times q^{N-1}$ is less than a preset memory dirty page threshold, and $CV_{ij}$ is a memory compression ratio of the to-be-migrated virtual machine.

* * * * *